United States Patent [19]

Hoshino et al.

[11] Patent Number: 5,176,767
[45] Date of Patent: Jan. 5, 1993

[54] BEAD WIRE FOR TIRE, RUBBER-COATED BEAD WIRE FOR TIRE AND TIRE USING THE SAME

[75] Inventors: Hiroshi Hoshino; Shinichi Miyazaki, both of Kobe, Japan

[73] Assignee: Sumitomo Rubber Industries, Ltd., Hyogo, Japan

[21] Appl. No.: 670,191

[22] Filed: Mar. 15, 1991

Related U.S. Application Data

[62] Division of Ser. No. 619,992, Nov. 30, 1990, Pat. No. 5,176,957.

[30] Foreign Application Priority Data

Dec. 5, 1989 [JP] Japan .................. 1-317125

[51] Int. Cl.⁵ .................. B60C 15/04; B60C 1/00
[52] U.S. Cl. .................. 152/451; 152/540; 152/547; 152/565; 156/910; 245/1.5; 428/381; 428/382; 428/625
[58] Field of Search .............. 152/539, 540, 451, 565, 152/547; 245/1.5; 156/151, 307.5, 910; 428/381, 382, 625

[56] References Cited

U.S. PATENT DOCUMENTS

| | | | |
|---|---|---|---|
| 2,135,886 | 11/1938 | Elder | 428/625 |
| 2,939,207 | 6/1960 | Adler | |
| 3,517,722 | 6/1970 | Endter | 152/565 |
| 3,629,038 | 12/1971 | Satake | 152/565 |
| 3,858,635 | 1/1975 | Nakamoto et al. | 428/677 |
| 3,869,261 | 3/1975 | Katsuma | 428/647 |
| 3,961,740 | 6/1976 | Nakamoto et al. | 428/677 |
| 4,195,679 | 4/1980 | Schonfeld et al. | 152/565 |
| 4,226,918 | 10/1980 | Friend | 152/565 |
| 4,683,175 | 7/1987 | Bakewell et al. | 428/375 |
| 4,704,337 | 11/1987 | Coppens et al. | 428/677 |
| 4,859,289 | 8/1989 | Nishimura et al. | |

FOREIGN PATENT DOCUMENTS

| | | | |
|---|---|---|---|
| 0010839 | 1/1933 | Australia | 152/540 |
| 2036241 | 2/1990 | Japan | 428/625 |
| 2256503 | 10/1990 | Japan | 245/1.5 |

OTHER PUBLICATIONS

Abstract of Japanese Patent Application 1-113234, May 1, 1989.
"Mechanical Engineers Handbook", Baumeister Editor, 1958, Sixth Edition, pp. 6-80-6-81.

Primary Examiner—Michael W. Ball
Assistant Examiner—Nancy T. Krawczyk
Attorney, Agent, or Firm—Birch, Stewart, Kolasch & Birch

[57] ABSTRACT

The present invention is directed to bead wires which has a Cu/Sn deposit having an Sn content of 9 to 13% by weight and a Cu content of 91 to 87% by weight, in an amount of 0.65 to 0.85 g per kilogram of the wire. The present invention is also directed to rubber-coated bead wires for tires comprising the plated bead wire as mentioned above, a rubber layer formed on the bead wire from a composition comprising 100 parts of a rubber polymer, 80 to 140 parts of a carbon, 4 to 10 parts of sulfur, 0.4 to 0.9 part of a vulcanization accelerator, 10 to 7 parts of zinc oxide, and 1 to 4 parts of stearic acid, and to tires prepared by using the above-mentioned bead wires. The bead wires of the present invention have excellent adhesion between the plated bead wire and the rubber layer, so that the tires obtained using such bead wires avoid wild wires.

14 Claims, 2 Drawing Sheets

BEAD WIRE FOR TIRE, RUBBER-COATED BEAD WIRE FOR TIRE AND TIRE USING THE SAME

This application is a divisional of copending application Ser. No. 07/619,992, filed on Nov. 30, 1990, now U.S. Pat. No. 5,178,957, the entire contents of which are hereby incorporated by reference.

BACKGROUND OF THE INVENTION

The present invention relates to a bead wire for tires, a rubber-coated bead wire for tires and a tire using the rubber-coated bead wires, and more particularly to a bead wire for tires which is plated with a metal mixture having a specific weight ratio in a specific amount, a rubber-coated bead wire for tires which is obtained by coating the specifically plated bead wire as mentioned above with a specific rubber composition and a tire prepared by using the rubber-coated bead wires as mentioned above.

In general, as to bead wires for tires, in order to improve the adhesion between a bead wire and the rubber layer formed on the bead wire, and particularly, when using the bead wires in a tire, to improve the deterioration of the adhesion resulting from the stress and heat caused by running the tire, the bead wire for tires is Cu/Sn-plated, then the plated bead wire is combined with a rubber composition which is coated on the plated bead wire (hereinafter referred to as "bead-coating rubber composition), and the obtained rubber-coated bead wire is used as bead cores in a tire.

The adhesion reaction between the bead wire and the rubber layer occurs during a vulcanization step, which is one step of the tire preparation steps. It is said that the adhesion reaction is caused between the bead wire and the rubber layer by the vulcanization to form a reaction layer. In order to obtain an excellent adhesion, it is necessary to obtain a reaction layer wherein the bead wire reacts with the rubber layer to form excellent adhesion.

Observing the rubber layer on the bead wire, as to the deterioration of the adhesion of tires in practical use, there are some tires wherein the peeling is caused in the reaction layer, which sometimes exerts a bad influence on the life of tires. When the bead wire does not strongly react with the rubber layer (the reaction layer does not have the excellent adhesion), the adhesion between the bead wire and the rubber layer is lowered by the stress and heat generated during the running of the tires. In some cases, the rubber layer is peeled off from the bead wire, and in other cases the bead wires protrude from the tire (such a damage of the bead portions is referred to as "wild wire"). Since the occurence of the above-mentioned disadvantages greatly depends on the stress and heat applied to the bead portions, these disadvantages are easily caused in tires used under conditions of heavy load and high speed, such as tires for airplanes which must bear a heavier load than loads applying to tires used in other categories and must withstand high speeds, such as not less than 300 km/hour.

In order to improve the disadvantages mentioned above, there has been known a method wherein triazine thiols are used as a crosslinking auxiliary for adhesion reaction between the rubber layer and the bead wire. When applying the method to tires used under the conditions of heavy load and high speed, for instance tires for airplanes, however, the adhesion is unsatisfactory and the cost becomes high.

An object of the present invention is to provide a bead wire for tires having an excellent adhesion.

A further object of the present invention is to provide a rubber-coated bead wire for tires having an excellent adhesion between the bead wire and the rubber layer.

A still further object of the present invention is to provide a tire improving the disadvantages as mentioned above.

These and other objects of the present invention will become apparent from the description hereinafter.

SUMMARY OF THE INVENTION

It has now been found that when a specific deposit on the bead wire is made specific, the plated bead wire has excellent adhesion, also when a rubber composition having a specific composition is combined with the plated bead wire as mentioned above, the obtained rubber-coated bead wire has improved adhesion between the plated bead wire and the rubber layer, and further when tires are prepared by using the rubber-coated bead wires having the improved adhesion as mentioned above in bead portions, the above-mentioned disadvantages of the conventional tires are improved.

In accordance with the present invention, there is provided a bead wire for tires having a Cu/Sn deposit having an Sn content of 9 to 13% by weight and a Cu content of 91 to 87% by weight, in an amount of 0.65 to 0.85 g per kilogram of the wire.

Also, in accordance with the present invention, there is provided a rubber-coated bead wire for tires which comprises a bead wire having a Cu/Sn-deposit having an Sn content of 9 to 13% by weight and a Cu content of 91 to 87% by weight, in an amount of 0.65 to 0.85 g per kilogram of the wire, and a rubber layer formed on the bead wire from a composition comprising 100 parts by weight of a rubber polymer, 80 to 140 parts by weight of a carbon, 4 to 10 parts by weight of sulfur, 0.4 to 0.9 part by weight of a vulcanization accelerator, 10 to 17 parts by weight of zinc oxide and 1 to 4 parts by weight of stearic acid.

Further, in accordance with the present invention, there is provided a tire comprising bead portions having bead cores prepared by circularly winding rubber-coated bead wires and a carcass rolled up from the inside in the axial direction of the tire toward the outside around the bead core; the rubber-coated bead wire comprising a bead wire having a Cu/Sn-deposit having an Sn content of 9 to 13% by weight and a Cu content of 91 to 87% by weight in an amount of 0.65 to 0.85 g per kilogram of the wire and a rubber layer formed on the bead wire from a composition comprising 100 parts by weight of a rubber polymer, 80 to 140 parts by weight of a carbon, 4 to 10 parts by weight of sulfur, 0.4 to 0.9 part by weight of a vulcanization accelerator, 10 to 17 parts by weight of zinc oxide and 1 to 4 parts by weight of stearic acid.

DETAILED DESCRIPTION

Figure 1:
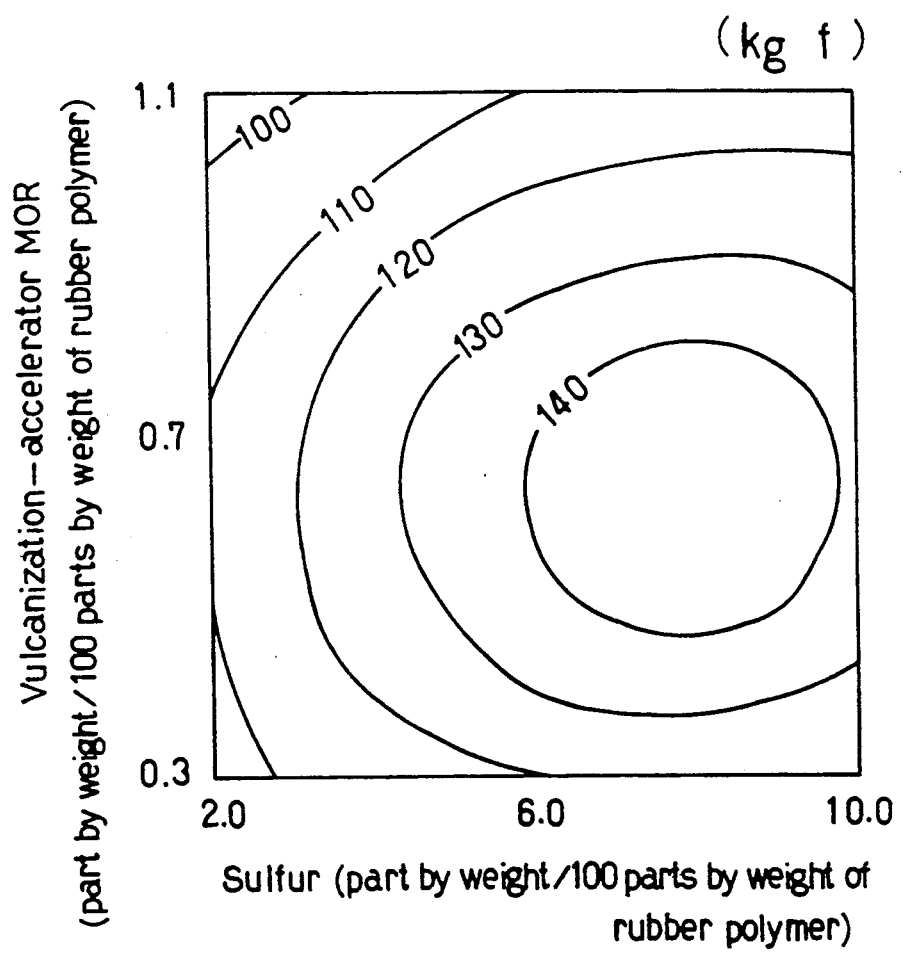
FIG. 1 is a graph showing how a drawing strength of rubber-coated bead wires obtained in Example 6 varies depending on the amounts of a vulcanization accelerator, MOR and sulfur.

It is generally said that it is important that the vulcanization rate of the bead-coating rubber composition is matched with the adhesion rate between the bead wire and the rubber layer with respect to the adhesion reaction between the bead wire and the rubber layer.

On the other hand, as to the rubber used in the rubber layer formed on the bead wire, generally, the vulcanization rate must be higher, (in other words a scorch time ($t_2$) and a 90%-vulcanizing time ($T_{90}$) must be shorter) than the vulcanization rates of components used in other portions of the tire, since the rubber layer on the bead wire is placed in an internal position of the tire. If the vulcanization rate of the rubber layer on the bead wire is slow, the cure of the rubber is insufficient.

It has now been found that in order to obtain the more excellent adhesion between the rubber layer having the vulcanization rate as mentioned above, and the bead wire, it is better that the rate of the adhesion reaction between the bead wire and the rubber layer is further increased. Further, it has now been found that when the composition of the deposit on the bead wire is specified to Cu and Sn, and the weight ratio of the two metals and the amount of the deposit are within specific ranges, the vulcanization rate is matched with the adhesion rate, to effectively obtain excellent adhesion. Also, when the rubber layer is formed on the plated bead wire from the specific rubber composition, an even more excellent adhesion is obtained.

In the present invention, the bead wire is Cu/Sn-plated, and the deposit on the bead wire has an Sn content of 9 to 13% by weight, preferably from 10 to 12% by weight and a Cu content of 91 to 87% by weight, preferably from 90 to 88% by weight. The amount of the deposit is from 0.65 to 0.85 g, preferably from 0.70 to 0.80 g, per kilogram of the wire.

In the present invention, the steel wires to be plated are not particularly limited. Any bead wire can be used so long as it is generally used as a bead wire for tires. For instance, hard steel wires having a diameter of 0.97 mm or 1.55 mm, can be used. Among them, high carbon steel wire rods according to Japanese Industrial Standards (JIS) G 3506 and JIS G 3502, for instance, SWRH 67A and SWRH 72A according to JIS G 3506 and SWRS 77A and SWRS 82A according to JIS G 3502 are preferable from the viewpoint of physical properties such as tensile load, elongation and torsion number.

Only when the bead wire has the Cu/Sn-deposit having the weight ratio of the two metals as specified above will in the amount as specified above, the lowering of the adhesion between the bead wire and the rubber layer be effectively prevented. Particularly, the plated bead wire of the present invention is preferably used in tires used under conditions of heavy load and high internal pressure, such as tires for airplanes.

When the Sn content in the deposit is less than 9% by weight, the activation of the adhesion reaction caused by the plating increases, thereby increasing the adhesion rate. If the vulcanization rate is matched to such an adhesion rate, burning is caused during the preparation steps. On the other hand, when the Sn content is more than 13% by weight, the activation of the adhesion reaction caused by the plating decreases, thereby decreasing the adhesion rate. If the vulcanization rate is matched to such an adhesion rate, the rubber is undercured, that is, the rubber is insufficiently cured during the vulcanization step.

Also, when the bead wire is Cu/Sn-plated in an amount of less than 0.65 g per kilogram of the wire, the activation of the adhesion reaction caused by the plating decreases, thereby decreasing the adhesion rate. If the vulcanization rate is matched to such an adhesion rate, the rubber is undercured during the vulcanization. On the other hand, when the amount is more than 0.85 g per kilogram of the wire, the activation of the adhesion rate caused by the plating increases, thereby increasing the adhesion rate. If the vulcanization rate is matched to such an adhesion rate, burning is caused during the preparation steps.

In the present invention, methods for Cu/Sn-plating the bead wire are not particularly limited, and the usual methods such as an electrolysis plating method and a thermal diffusion method are applicable to the plating method of the present invention.

The degree of plating is not particularly limited, and the plating having the uniformity equal to the uniformity of the plating of the usually plated bead wires for tires will suffice for the present invention.

Next, in the present invention, the bead wire as plated above is covered with a specific rubber composition. The following explains the bead wire for tires, which is coated with the rubber (rubber-coated bead wire).

The reason why the plated bead wire for tires is coated with the rubber composition is that, as mentioned above, the reaction layer wherein the adhesion reaction is sufficient (strong adhesion reaction) is formed between the plated bead wire and the rubber layer to make the adhesion between the bead wire and the rubber layer excellent, thus resulting in the improvement in the durability of the bead core.

In the present invention, the rubber composition to be coated on the plated bead wire (bead-coating rubber composition) comprises the rubber polymer, the carbon, sulfur, the vulcanization accelerator, zinc white (zinc oxide) and stearic acid.

The rubber polymer is one of the principal components of the bead-coating rubber composition and is used for obtaining elastomeric properties. Examples of the rubber polymers are, for instance, a natural rubber, a blend of a natural rubber and isoprene rubber, a blend of a natural rubber, isoprene rubber and liquid isoprene rubber, a blend of a natural rubber and SBR (styrene butadiene rubber), and the like. The rubber polymers are not limited thereto and any rubber polymer can be used so long as it is usually used as the rubber polymer in bead-coating rubber compositions.

The carbon is a principal component of the bead-coating rubber composition together with the rubber polymer and is used for increasing the reinforcement of the rubber.

The particle size of the carbon is not particularly limited and any carbon can be used so long as it is usually used in bead-coating rubber compositions. As the carbon, GPE (General Purpose Furnace) and FEF (Fast Extruding Furnace) and their mixtures are preferable from the viewpoints of the cost and processability.

The amount of the carbon is from 80 to 140 parts by weight, preferably from 100 to 140 parts by weight, based on 100 parts by weight of the rubber polymer. When the amount of the carbon is less than 80 parts by weight, the hardness is unsatisfactory, so it is difficult to use the rubber in the bead cores of tires used under the conditions of heavy load and high speed. On the other hand, when the amount is more than 140 parts by weight, the viscosity (Mooney viscosity) is high, so it is difficult to prepare tires.

Sulfur is used for obtaining the excellent adhesion, in other words an adhesive strength, and the high percentage of bead wires to which the rubber adheres, between the Cu/Sn-plated bead wire as specified above and the rubber layer, as well as vulcanizing the rubber polymer. The term "percentage of bead wires to which the rubber adheres" used herein means a percentage of bead wires having no metal gloss, to which the rubber adheres after the plated bead wire is embedded into the rubber composition and the wire is drawn. The purity of sulfur is not particularly limited, and any sulfur can be used so long as it is usually used for vulcanizing rubbers for tires.

The amount of sulfur is from 4 to 10 parts by weight, preferably from 6 to 8 parts by weight, based on 100 parts by weight of the rubber polymer. When the amount of sulfur is less than 4 parts by weight, the amount of sulfur used in the vulcanization reaction of the rubber and in the adhesion reaction between the plated bead wire and the rubber layer is in short supply, and as a result, the excellent adhesion cannot be obtained. On the other hand, when the amount is more than 10 parts by weight, blooming of sulfur on the mixed rubber stock (before vulcanization) is caused, which is disadvantageous to the preparation.

As the vulcanization accelerator used in the present invention, the usual vulcanization accelerators can be used. Examples of the vulcanization accelerators are, for instance, thiazole accelerators such as M (2-mercaptobenzothiazole), DM (dibenzothiazyl disulfide) and MZ (zinc salt of 2-mercaptobenzothiazole), sulfenamide accelerators such as CZ (N-cyclohexyl-2-benzothiazolylsulfenamide), NS (N-tertbutyl-2-benzothiazolylsulfenamide), MOR (N-oxydiethylene-2-benzothiazolylsulfenamide) and DZ (N,N-dicyclohexyl-2-benzothiazolylsulfenamide), dithiocarbamate accelerator such as EZ (zinc diethyldithiocarbamate), BZ (zinc D-n-butyldithiocarbamate), PX (zinc ethylphenyldithiocarbamate) and ZP (zinc N-pentamethylene dithiocarbamate), guanidine accelerators such as D (1,3-diphenylguanidine), DT (di-o-tolylguanidine), BG (1-o-tolylbiguanidine) and PR (di-o-tolylguanidine salt of dicatechol borate), thiuram accelerators such as TT (tetramethylthiuramdisulfide), TET (tetraethylthiuramdisulfide), TBT (tetrabutylthiuramdisulfide) and TS (tetramethylthiurammonosulfide), and the like. Among the vulcanization accelerators, MOR which has a long scorch time ($t_2$) and a fast vulcanization rate ($T_{90}$) and blends of MOR and another vulcanization accelerator are preferable from the viewpoints of burning in the steps and undercure.

The amount of the vulcanization accelerator is from 0.4 to 0.9 part by weight, preferably from 0.6 to 0.8 part by weight, based on 100 parts by weight of the rubber polymer. When the amount of the vulcanization accelerator is less than 0.4 part by weight, the vulcanization rate of the rubber on the bead wire becomes slow, so the rubber is undercured. On the other hand, when the amount is more than 0.9 part by weight, the vulcanization rate is increased, so that burning occurs during the preparation steps.

Zinc white is reacted with stearic acid to give zinc, stearate functioning as a vulcanization auxiliary.

When sulfur is used in a large amount compared to the used amount of the rubber polymer, as in the present invention, the use of a small amount of zinc stearate results in insufficient vulcanization, and the use of a large amount of zinc stearate results in crystallization of the rubber component and lowering of the breaking strength of the rubber on the bead wire. From the above-mentioned viewpoints, the amount of the zinc white is from 10 to 17 parts by weight, preferably from 12 to 15 parts by weight, based on 100 parts by weight of the rubber polymer. Also, the amount of stearic acid is from 1 to 4 parts by weight, preferably from 2 to 3 parts by weight, based on 100 parts by weight of the rubber polymer.

As mentioned above, since zinc white and stearic acid react to form zinc stearate, and the formed zinc stearate functions as the vulcanization accelerator, it is possible to use zinc stearate instead of zinc white and stearic acid in the bead-coating rubber composition. However, when zinc stearate is used from the beginning, the vulcanization is accelerated in excess, so that handling time is shortened. Accordingly, it is preferable to use the combination of zinc white and stearic acid.

The rubber-coated bead wires of the present invention prepared by forming the rubber layer on the above-mentioned plated bead wire from the above-mentioned bead-coating rubber composition are used as the bead cores. The bead core is prepared by circularly winding a desired number of the rubber-coated bead wires (for instance, about 5 to 30 wires) arranged side-by-side in a row having the desired number of turns (for instance, about 5 to 40 turns) so as to set a turn on a previous turn.

The thus obtained wound bead wires can be used as they are as the bead cores in the preparation of the tires. When rubber layers are formed on an upper portion (tread side) and both sides, preferably the upper portion, a bottom portion (axial side) and both sides, of the wound bead wires, and they are used as the bead cores, the occurence of wild wire can be prevented. Although the mechanism by which the occurrence of wild wire can be prevented by using the wound rubber-coated bead wires on which the rubber layers are formed as the bead cores is not clear, it can be assumed as follows:

The bead portions are fatigued by the compression shear strength caused by the rotation of the tire, and the temperature elevation caused by the heat generation and conduction of break heat, to deteriorate the adhesion between the bead wire and the rubber layer, with the result that the bead wires can easily move. On the other hand, since while rotating, the tires receive the load, the force is applied to the bead wire in the opposite direction to the rotation direction of the tires. Particularly, when the winding direction of the bead wires is the same as the rotation direction of the tire, the end portions of the wound bead wires are peeled by the impact caused by the rotation of tire, and they repeat compression propagation to reach the compression fracture of the bead wires, with the result that the cut bead wires move toward the rotation direction and protrude from the tire. When the rubber layers are formed on, particularly the upper portion and both the sides, however, the impact caused by the rotation of the tire is alleviated, to decrease the deterioration of adhesion.

As the rubber layer to be formed on the circularly wound bead wires, it is preferable that the same rubbers as used in the bead-coating rubber composition are used and are formed in a thickness of about 0.5 to 1.5 mm.

In the present invention, the bead cores, which are the circularly wound rubber-coated bead wires so as to set a turn on a previous turn, preferably the bead cores which are the circularly wound bead wires having the rubber layers formed on their upper portion and both sides, more preferably the bead cores which are the circularly wound bead wires having the rubber layers formed on their upper portion, both sides and bottom portion, are wrapped up in a canvas for wrapping bead core which is coated with a rubber, and the thus prepared bead cores are used in the bead portions. Then, the carcass is rolled up from the inside in the axial direction of the tire toward the outside around the bead portion, and the thus obtained bead portion around which the carcass is rolled up, a carcass rubber, a rubber for the side wall and the materials for the tread are assembled and vulcanization is conducted to give a tire.

The kinds of the carcass, carcass rubber, rubber for the side wall and materials the tread, and the conditions for assembling, forming and vulcanizing are not particularly limited, and materials and conditions which are usually adopted are applicable to the preparation of the tires of the present invention.

The thus prepared tires of the present invention have excellent adhesion between the plated bead wire and the rubber layer, so it is difficult to cause wild wires, since in the tires of the present invention, the rubber-coated bead wires comprising the plated bead wires having the Cu/Sn deposit having the specific composition in the specific amount, the plating being capable of giving the excellent adhesion between the plated bead wire and the rubber layer and excellent properties to the tire, and the rubber layer formed on the bead wire from the specific composition are used. Accordingly, the tires of the present invention are particularly suitable for use under the conditions of heavy load and high speed such as for airplane tires.

The present invention is more specifically described and explained by means of the following Examples wherein all percents and parts are by weight unless otherwise noted. It is to be understood that the present invention is not limited to the Examples, and various changes and modifications may be made in the invention without departing from the spirit and scope thereof.

EXAMPLES 1 TO 4 AND COMPARATIVE EXAMPLES 1 TO 10

A steel wire was Cu/Sn-plated to give a bead wire having a Cu/Sn deposit having an Sn content of 8%, 10%, 12% or 14% in an amount of 0.55 g/kg, 0.65 g/kg, 0.75 g/kg or 0.90 g/kg.

The plated bead wires were embedded in a bead-coating rubber composition shown in Table 1 in a length of 50 mm, the vulcanization was conducted at a temperature of 150° C. for 35 minutes under a mold face pressure of 60±30 kg/cm² to give a sample having a thickness of about 14 mm and a space of the wires of about 12.5 mm. Then, the sample was allowed to cool at room temperature for not less than 12 hours, burrs were removed therefrom and bead wires sticking out from the rubber were cut off with a grinder or nipper. The obtained sample was drawn at a drawing rate of 50 mm/minute in a drawing slit width of 8 mm to measure a drawing strength and a percentage of bead wires having no metal gloss to which the rubber adhered (a percentage of the bead wires to which the rubber adhered).

The results are shown in Table 2.

TABLE 1

| Bead-coating rubber composition | A | B | C |
| --- | --- | --- | --- |
| Composition (part) | | | |
| Natural rubber | 100 | 100 | 75 |
| SBR | — | — | 25 |
| FEF | 120 | 120 | 120 |
| Stearic acid | 2 | 4 | 2 |
| Zinc white | 15 | 5 | 5 |
| Sulfur | 6 | 4 | 4 |
| Vulcanization accelerator | | | |
| MOR | 0.5 | 0.9 | 0.9 |
| DZ | 0.4 | — | — |
| Property of the composition* | | | |
| Minimum torque (kg · cm) | 4.0 | 4.3 | 5.1 |
| Scorch time, t₂ (minute) | 4.3 | 6.3 | 8.3 |
| 90%-vulcanization time (minute) | 20.0 | 16.8 | 19.8 |
| Maximum torque (kg · cm) | 49.4 | 43.1 | 41.3 |

(Note)
*measured by a Curelastometer III (@ 150° C.) commercially available from Japan Synthetic Rubber Co., Ltd.

TABLE 2

| | Deposite | | Drawing strength (kg/wire) [Percentage of wires to which the rubber adhered (%)] | | |
| --- | --- | --- | --- | --- | --- |
| | Sn content (%) | Amount of deposite (g/kg) | Composition A | Composition B | Composition C |
| Com. Ex. 1 | 8 | 0.65 | 125 [45] | 115 [25] | 95 [15] |
| Com. Ex. 2 | 8 | 0.75 | 125 [40] | 130 [45] | 65 [0] |
| Com. Ex. 3 | 8 | 0.90 | 115 [45] | 120 [50] | 70 [5] |
| Com. Ex. 4 | 10 | 0.55 | 120 [60] | 90 [30] | 85 [15] |
| Ex. 1 | 10 | 0.65 | 135 [70] | 120 [50] | 80 [10] |
| Ex. 2 | 10 | 0.75 | 140 [70] | 125 [55] | 90 [15] |
| Com. Ex. 5 | 10 | 0.90 | 140 [75] | 125 [55] | 110 [40] |
| Com. Ex. 6 | 12 | 0.55 | 125 [60] | 100 [35] | 90 [30] |
| Ex. 3 | 12 | 0.65 | 135 [70] | 125 [55] | 85 [25] |
| Ex. 4 | 12 | 0.75 | 140 [80] | 130 [60] | 85 [25] |
| Com. Ex. 7 | 12 | 0.90 | 125 [60] | 120 [45] | 100 [30] |
| Com. Ex. 8 | 14 | 0.55 | 110 [35] | 90 [20] | 120 [55] |
| Com. Ex. 9 | 14 | 0.65 | 110 [45] | 100 [35] | 95 [40] |
| Com. Ex. 10 | 14 | 0.75 | 105 [30] | 105 [40] | 100 [45] |

From the results of the drawing strength and the percentage of bead wires to which the rubber adhered as to the bead-coating rubber compositions, A, B and C as shown in Table 2, it would be understood that the most preferable Sn content of the deposit was 12% and the amount of the deposit was 0.75 g per kilogram of the wire.

EXAMPLE 5 AND COMPARATIVE EXAMPLE 11

A steel wire was Cu/Sn-plated in the approximately same manner as in Example 4 to give a bead wire having a Cu/Sn deposit having an Sn content of 12.3% in an amount of 0.74 g/kg. The plated bead wire was coated with the bead-coating rubber composition B shown in Table 1 in a thickness of 0.3 mm. The eight rubber-coated bead wires arranged side by side in a row were circularly wound 10 turns so as to set a turn on a previous turn, the same rubber as used in the bead-coating rubber composition B was wound around the wound bead wires in a thickness of 1 mm, around which a canvas for wrapping bead wires coated with a rubber was further wound to give a bead core. Using the obtained bead cores, tires for airplane H 46×18.0-20 were made, and the tires were run under TSO C62C running conditions. Then, the rubber-coated bead wires were sampled from the tires, and the drawing test was conducted four times in the same manner as in Example 1 to give percentages of bead wires to which the rubber adhered.

The procedure of Example 5 was repeated except that a plated bead wire having a Cu/Sn deposit having an Sn content of 12.2% in an amount of 0.55 g/kg was used to give a rubber-coated bead wire. Then, using the rubber-coated bead wires, tires were prepared and the running test was conducted in the same manner as in Example 5. After sampling the rubber-coated bead wires from the tested tires, the drawing test was conducted in the same manner as in Example 5 to give percentages of bead wires to which the rubber adhered (Comparative Example 11).

The results are shown in Table 3.

TABLE 3

|  | Sn-content (%) | Amount of Cu/Sn-deposite (g/kg) | Percentage of bead wires to which the rubber adhered (N = 4) |
|---|---|---|---|
| Ex. 5 | 12.3 | 0.74 | 50, 60, 65, 65 |
| Com. Ex. 11 | 12.2 | 0.55 | 30, 35, 40, 40 |

EXAMPLE 6

A steel wire was Cu/Sn-plated to give a bead wire having a deposit having an Sn content of 12.0% and a Cu content of 88.0% in an amount of 0.75 g/kg (the same plated bead wire as obtained in Ex. 4). The rubber-coated bead wire was embedded in a bead-coating rubber composition of 100 parts of a natural rubber, 120 parts of carbon GPF, 2 parts of stearic acid, 15 parts of zinc white, 2 to 10 parts of sulfur and 0.30 to 1.10 parts of a vulcanization accelerator MOR in a length of 50 mm, the vulcanization was conducted at a temperature of 150° C. for 35 minutes under a mold face pressure of 60±30 kg/cm². Then, the procedure of Example 1 was repeated to give samples and the drawing test was conducted at a drawing rate of 50 mm/minute in a drawing slit width of 8 mm to measure drawing strengths and percentages of bead wires to which the rubber adhered.

Figure 2:
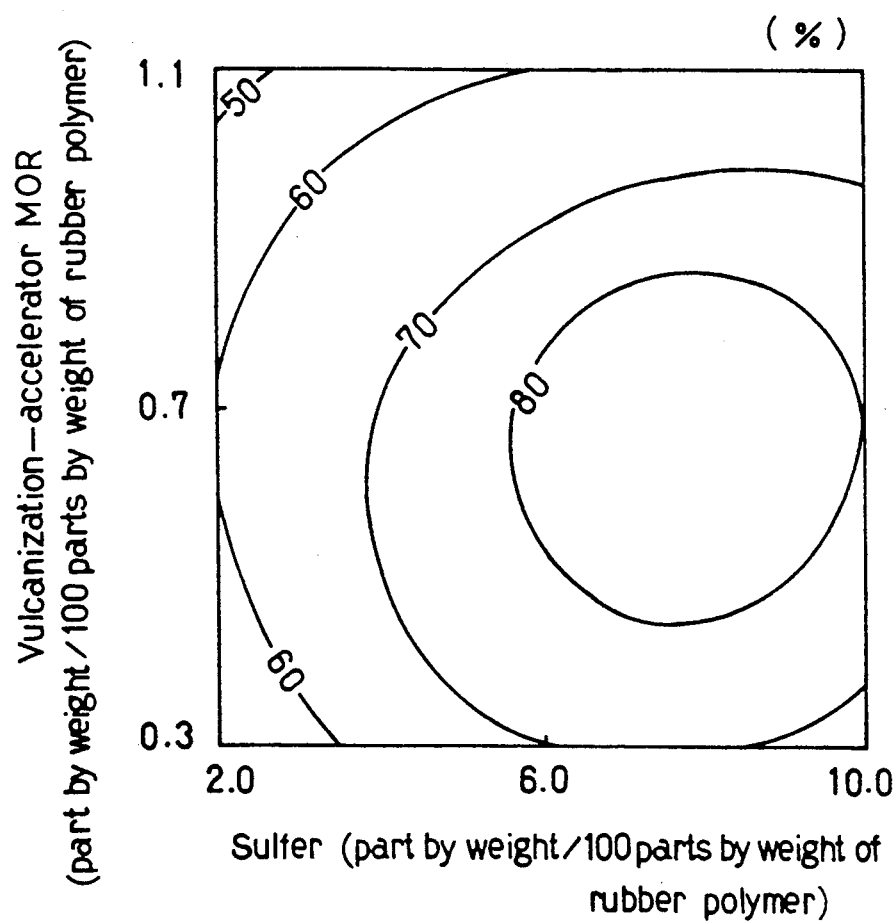
FIG. 2 is a graph showing how the percentage of bead wires to which a rubber adheres, of the rubber-coated bead wires obtained in Example 6 varies depending on the amounts of vulcanization accelerator, MOR and sulfur.

The results are shown in FIGS. 1 and 2.

EXAMPLE 7 AND COMPARATIVE EXAMPLE 12

A steel wire was Cu/Sn-plated in the approximately same manner as in Example 6 to give a bead wire having a Cu/Sn deposit having an Sn content of 12.3% in an amount of 0.74 g/kg. The plated bead wire was coated with a bead-coating rubber composition of 100 parts of a natural rubber, 120 parts of FEF, 6 parts of sulfur, 0.5 part of MOR and 0.2 part of DZ which were vulcanization accelerators, 15 parts of zinc white, and 2 parts of stearic acid in a thickness of 0.3 mm. The eight rubber-coated bead wires arranged side by side in a row were wound 10 turns so as to set a turn on a previous turn, the same rubber as used in the bead-coating rubber composition was wound around the wound bead wires in a thickness of 1 mm, around which a canvas for wrapping bead wire coated with a rubber was further wound to give a bead core. Using the bead cores, tires for airplane H 46×18.0-20 were made, and the tires were run under TSO C62C running conditions. Then, the rubber-coated bead wires were sampled from the tires, the drawing test was conducted four times in the same manner as in Example 1 to give percentages of the bead wires to which the rubber adhered.

The procedure of Example 7 was repeated except that a plated bead wire having a Cu/Sn deposit having an Sn content of 12.2% in an amount of 0.55 g/kg was used to give a rubber-coated bead wire, and as the bead-coating rubber composition to be coated on the plated bead wire, the bead-coating rubber composition B shown in Table 1 was used. Using the bead wires, tires were made and the running test was conducted in the same manner as in Example 7 to give percentages of bead wires to which the rubber adhered (Comparative Example 12).

The results are shown in Table 4.

TABLE 4

|  | Sn-content (%) | Amount of Cu/Sn-deposite (g/kg) | Percentage of bead wires to which the rubber adhered (N = 4) |
|---|---|---|---|
| Ex. 7 | 12.3 | 0.74 | 60, 70, 80, 80 |
| Com. Ex. 12 | 12.2 | 0.55 | 30, 35, 40, 40 |

As shown above, the bead wires of the present invention have the Cu/Sn deposit having a specific weight ratio of Cu and Sn in a specific amount, and are excellent in adhesion. Also, the rubber-coated bead wires of the present invention have the rubber layer having remarkably excellent adhesion to the plated bead wire as mentioned above on the plated bead wire. Accordingly, the plated bead wires, particularly the rubber-coated bead wires of the present invention have excellent adhesion between the plated bead wire and the rubber layer, and as to the tires using the bead wires of the present invention, it is difficult to cause wild wires.

In addition to the ingredients used in Examples, other ingredients can be used in the Examples as set forth in the specification to obtain substantially the same results.

What we claim is:

1. A rubber-coated bead wire for tires comprising:
   a bead wire comprising a wire and a Cu/Sn deposit thereon, wherein said Cu/Sn deposit has an Sn content of 9 to 13% by weight and a Cu content of 91 to 87% by weight, and wherein said Cu/Sn deposit is present in an amount of 0.65 to 0.85 gram per kilogram of said bead wire; and
   a rubber layer formed on said bead wire from a composition comprising 100 parts by weight of a rubber polymer, 80 to 140 parts by weight of a carbon, 4 to 10 parts by weight sulfur, 0.4 to 0.9 part by weight of a vulcanization accelerator, 10 to 17 parts by weight of zinc oxide, and 1 to 4 parts by weight of stearic acid.

2. A tire comprising:
   a plurality of bend portions, each comprising a plurality of bead cores, wherein said bead cores have been prepared by circularly winding the rubber-coated bead wires of claim 1; and a carcass, said carcass having been rolled up from the inside in the axial direction of said tire toward the outside around said bead cores.

3. The rubber-coated bead wire of claim 1, wherein said Cu/Sn deposit has an Sn content of 10 to 12% by weight and a Cu content of from 90 to 88% by weight.

4. The rubber-coated bead wire of claim 1, wherein said Cu/Sn deposit is present in an amount of from 0.70 to 0.80 gram per kilogram of said bead wire.

5. The rubber-coated bead wire of claim 1, wherein said rubber layer is formed from a composition comprising 100 to 140 parts by weight of said carbon, based on 100 parts by weight of said rubber polymer.

6. The rubber-coated bead wire of claim 1, wherein said rubber layer is formed from a composition comprising 6 to 8 parts by weight of said sulfur, based on 100 parts by weight of said rubber polymer.

7. The rubber-coated bead wire of claim 1, wherein said rubber layer is formed from a composition comprising 0.6 to 0.8 part by weight of said vulcanization accelerator, based on 100 parts by weight of said rubber polymer.

8. The rubber-coated bead wire of claim 1, wherein said rubber layer is formed from a composition comprising 12 to 15 parts by weight of said zinc oxide and 2 to 3 parts by weight of said stearic acid, both based on 100 parts by weight of said rubber polymer.

9. The tire of claim 2, wherein said Cu/Sn deposit has an Sn content of 10 to 12% by weight and a Cu content of from 90 to 88% by weight.

10. The tire of claim 2, wherein said Cu/Sn deposit is present in an amount of from 0.70 to 0.80 gram per kilogram of said bead wire.

11. The tire of claim 2, wherein said rubber layer is formed from a composition comprising 100 to 140 parts by weight of said carbon, based on 100 parts by weight of said rubber polymer.

12. The tire of claim 2, wherein said rubber layer is formed from a composition comprising 6 to 8 parts by weight of said sulfur, based on 100 parts by weight of said rubber polymer.

13. The tire of claim 2, wherein said rubber layer is formed from a composition comprising 0.6 to 0.8 part by weight of said vulcanization accelerator, based on 100 parts by weight of said rubber polymer.

14. The tire of claim 2, wherein said rubber layer is formed from a composition comprising 12 to 15 parts by weight of said zinc oxide and 2 to 3 parts by weight of said stearic acid, both based on 100 parts by weight of said rubber polymer.

* * * * *